United States Patent [19]
Briggs et al.

[11] 3,751,989
[45] Aug. 14, 1973

[54] FIXTURE AND SYSTEM FOR TREATING TEST PIECES ON A RAPID CYCLE LEAK DETECTION APPARATUS

[75] Inventors: Walton E. Briggs, Lynnfield; Paul R. Fruzzetti, North Easton, both of Mass.

[73] Assignee: Varian Associates, Palo Alto, Calif.

[22] Filed: July 2, 1971

[21] Appl. No.: 159,234

[52] U.S. Cl................................. 73/40.7, 250/41.9 G
[51] Int. Cl. ............................................ G01m 3/04
[58] Field of Search.................... 73/40.7, 49.2, 45.2, 73/38, 45.5; 250/41.9 G

[56] References Cited
UNITED STATES PATENTS

| | | | |
|---|---|---|---|
| 3,633,406 | 1/1972 | Helms | 73/45.5 |
| 3,034,338 | 5/1962 | Snyder | 73/40.7 |
| 2,696,107 | 12/1954 | Blaing-Leisk | 73/45.2 |
| 3,126,734 | 3/1964 | Stutzman | 73/40.7 X |
| 3,520,178 | 7/1970 | Scharf | 73/49.2 |

*Primary Examiner*—Louis J. Capozi
*Attorney*—Stanley Z. Cole and Leon F. Herbert

[57] ABSTRACT

The test piece is clamped to the base of the fixture in such a way that one side of said test piece is exposed to a vacuum created by the leak detection apparatus and the other side of said test piece is exposed to a test-gas receiving chamber. The act of clamping the test piece to the base of the fixture causes the test-gas receiving chamber to be formed and simultaneously causes a test gas such as helium to fill said chamber to a predetermined pressure. After the test piece has been clamped into testing position and the test gas has filled the test-gas chamber, a mechanism is activated which admits air to said chamber at higher pressure than said test gas therein and which simultaneously activates the leak detection apparatus. Before the leak detection apparatus connects said one side of the test piece to vacuum, the high-pressure air is cut off and said test-gas chamber contains only a small quantity of high-pressure air and is not open to the source of high-pressure air. Thus, if a particular test piece has a leak, the quantity of high-pressure air passing through the leak will be insufficient to damage the delicate mechanism of the leak detection apparatus.

10 Claims, 2 Drawing Figures

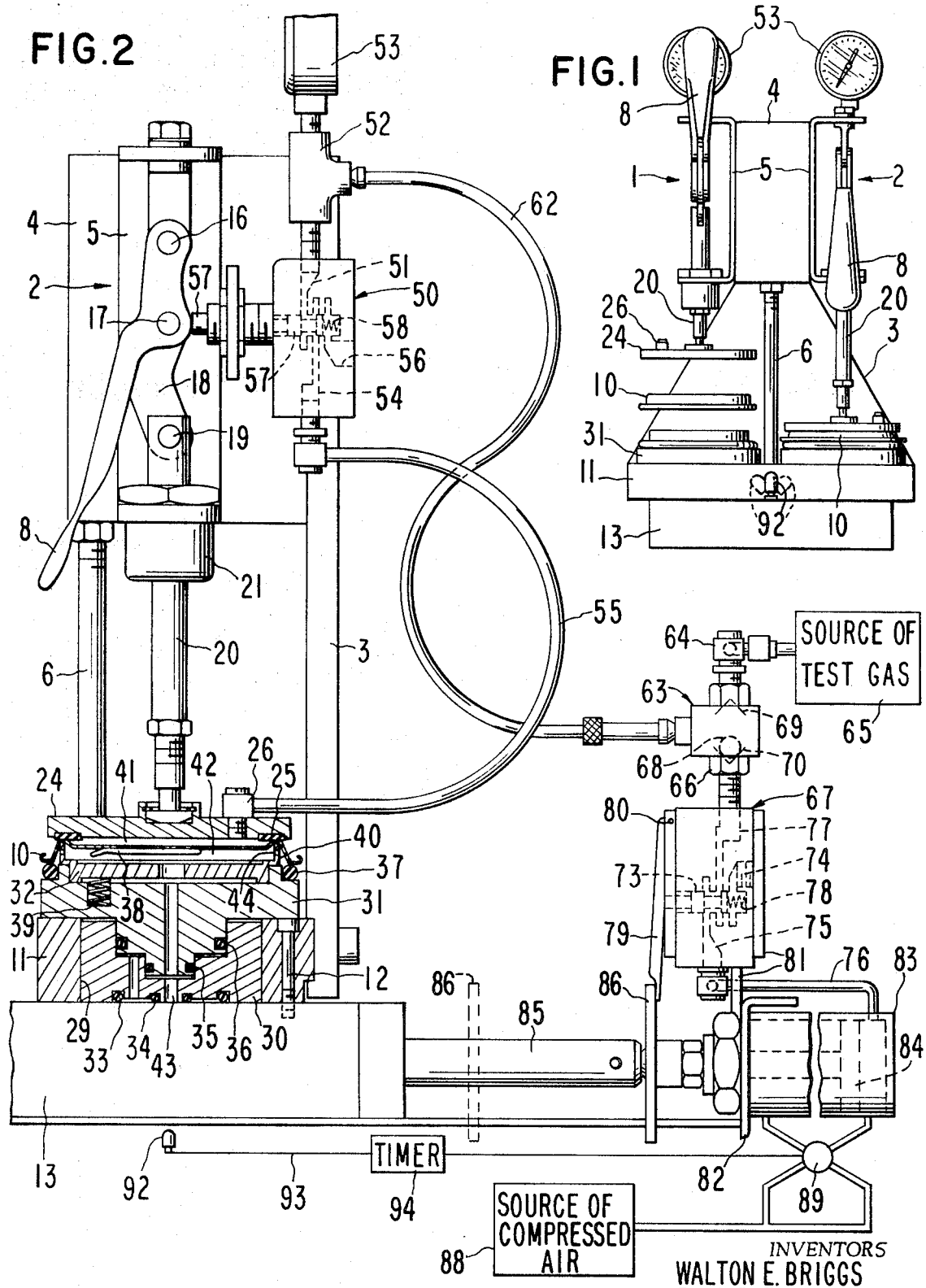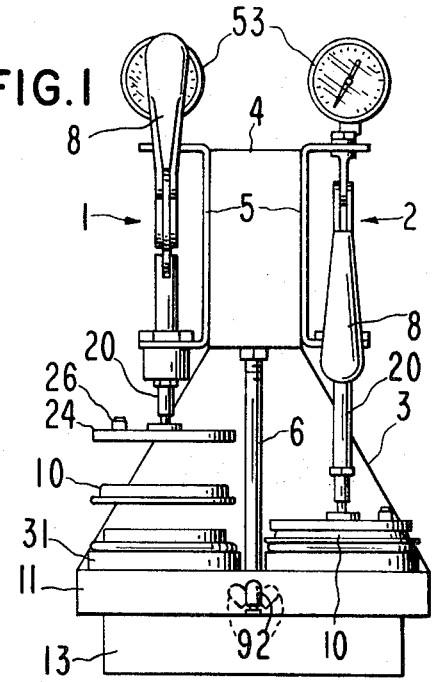

FIXTURE AND SYSTEM FOR TREATING TEST PIECES ON A RAPID CYCLE LEAK DETECTION APPARATUS

BACKGROUND OF THE INVENTION

1. Field of the Invention

This invention is a further development in the art of measurements, and particularly in the technique for leak detection employing a high pressure differential.

2. Description of the Prior Art

Use of a test gas under pressure for detecting leaks is well known. However, prior art techniques have generally been slow and unquantitative. In one approach, leaks are detected by observing gas bubbles rising in a container of liquid such as water. A mechanical device for detecting leaks by this method is disclosed in U.S. Pat. No. 3,323,351. An improved quantitative leak detector is disclosed in U.S. Pat. No. 3,385,102 wherein the leaking test gas is detected by a very sensitive mass spectrometer. However, it has been impracticable heretofore to use a test gas under pressure for quantitative measurement of leakage by sensitive gas analysis instruments because rupture of the test piece would generally cause the high-pressure test gas to damage said instruments.

SUMMARY OF THE INVENTION

This invention teaches an apparatus and technique for using a test gas at high pressure in conjunction with a leak detection apparatus which incorporates a fine-vacuum gas analysis instrument such as a mass spectrometer for rapid and quantitatively measured leak detection. It is a feature of this invention that the test gas may be used at a high pressure without danger to the sensitive instruments in the leak detection apparatus. It is another feature of the invention to provide a substantially automatic testing apparatus. It is also a feature of the invention to provide a testing apparatus which can be conveniently and quickly loaded and unloaded by the operator.

BRIEF DESCRIPTION OF THE DRAWINGS

FIG. 1 is a front view of a two-station fixture system which embodies the features of this invention.

FIG. 2 is a side view taken from the right of FIG. 1 but showing the lower part in cross section.

DESCRIPTION OF THE PREFERRED EMBODIMENT

FIG. 1 shows a pair of fixtures 1 and 2 mounted on a common supporting structure including a support plate 3, block 4, U-shaped brackets 5 and a supporting rod 6. The block 4 is secured to the plate 3. The brackets 5 and the rod 6 are secured to the block 4. Each of the fixtures can be operated singly or as a member of a plurality of such fixtures. Fixture 1 is shown with the handle 8 of a toggle clamping device in the upward position, while fixture 2 is shown with an identical handle in the downward position. In FIG. 1, a test piece 10 is shown about to be lowered manually by the operator into test position in fixture 1, and a test piece has been clamped into test position in fixture 2. The test piece 10 could be for example the metal top of a beverage container such as a beer can.

The support plate 3 and the support rod 6 are secured to a base member 11. As shown in FIG. 2, base 11 is mounted by screws 12 (only one shown) to a valve housing 13 of a rapid-cycle leak detection apparatus. For example, the housing 13 corresponds to the housing for valve spools 50 and 150 in U.S. Pat. No. 3,385,102.

The toggle clamp for each fixture includes the handle 8 which is mounted on a fixed pivot 16 supported from the bracket 5. The handle 8 carries a travelling pivot 17 which pivotally supports an arm 18. Arm 18 is pivotally connected at 19 to a vertically movable clamping rod 20. Rod 20 is mounted in a sleeve bearing 21 secured to the bottom of bracket 5. The bottom of rod 20 carries a cylindrical dome cover 24. An annular sealing ring 25 of material such as rubber is secured in the underside of dome cover 24. A gas connecting fitting 26 is mounted in dome cover 24 to permit the passage of gas through the dome cover as will be hereinafter described in more detail.

As indicated in FIG. 2, base 11 has a circular bore 29 therethrough centered under each of the clamping rods 20 for the fixtures 1 and 2. Each of the bores 29 receives a cylindrical insert 30, and each of the inserts 30 receives a cylindrical adaptor 31. A test piece supporting and locating disk 32 of circular shape is received in each adaptor 31. O-rings 33 and 34 of suitable material such as rubber seal the bottom of insert 30 against the top of valve housing 13. Similarly, O-rings 35 and 36 seal the adaptor 31 in the insert 30. An O-ring 37 is positioned over the outer portion of adaptor 31. As shown in FIG. 2, the lower periphery of the test piece 10 is sealed against O-ring 37 when the test piece is clamped in testing position. The test piece 10 shown in FIG. 2 has a conventional pull-tab 38. The locating disk 32 is mounted on springs 39. Only one such spring is shown but it will be understood that three or more of the springs are uniformly placed around a circle concentric with the axis of disk 32. One function of springs 39 is to raise the test piece 10 for easy grasping by the operator when handle 8 is raised. The travel of springs 39 is limited so they merely raise the disk 32 but do not eject it from the adaptor 31.

Disk 32 includes an upwardly extending annular rim 40 which engages the undersurface of the test piece. The springs 39 also serve to allow the test piece 10 to be easily centered on the rim 40, because when the disk 32 is in its raised position the test piece will not be held away from the disk 32 by abutment of the test piece 10 against the O-ring 37. When the handle 8 is moved to its lower position, as in FIG. 2, the upper surface of the test piece 10 will be sealed against sealing ring 25 and the lower surface will be sealed against O-ring 37. Thus a gas-receiving chamber 41 will be formed between the dome cover 24 and the upper surface of the test piece 10, and an evacuation chamber 42 will be formed between the lower side of the test piece and the locating disk 32. Each of the members 30, 31 and 32 has a central bore therethrough forming an evacuation passage 43. Passage 43 is located so that it communicates with the test port in the vacuum detection apparatus. More specifically, the evacuation passage 43 for each of the fixtures 1 and 2 is positioned in aligned communication above the test port 40 in U.S. Pat. No. 3,385,102. Rim 40 on the locating disk 32 has a plurality of apertures 44 to permit leak checking of the outer part of test piece 10.

A conventional spool valve 50 is attached to the block 4 for each of the fixtures 1 and 2 respectively. Valve 50 has an upper port 51 connected to a T-fitting 52 which supports a pressure gauge 53. Valve 50 has a lower port 54 which is connected by a flexible line 55 to the gas fitting 26 on the dome cover 24. Valve 50 also has an exhaust port 56 which opens to the atmosphere. The valve 50 has a valve spool 57 which is normally biased to the left by spring 58. When the handle 8 is moved to its downward position it abuts the left end of spool 57 and forces the spool to the position shown in FIG. 2, in which position port 51 is connected to port 54. When the handle 8 is moved to its upper position it moves away from the left end of spool 57 and the spool is permitted to move to the left so that port 51 is isolated and port 54 is connected to the exhaust port 56.

A gas conduit 62 is connected from T-fitting 52 to a conventional shuttle valve 63. The shuttle valve 63 has an inlet fitting 64 connected to a source of test gas 65. The valve 63 also has an inlet fitting 66 connected to a spool valve 67. As indicated schematically in dotted lines, the shuttle valve 63 has a valve ball 68 which in its upper position closes against a seat 69 and in its lower position closes against a seat 70. The ball 68 is moved to its upper position when air under higher pressure than the test gas is admitted to inlet 66.

The spool valve 67 is substantially the same as spool valve 50, except that its exhaust port is closed by a plug 74. The valve 67 has an inlet port 75 connected to a high pressure air line 76, and an outlet port 77 connected to the inlet fitting 66 of valve 63. A valve spool 73 is biased to the left by spring 78 and is moved to the right by actuating lever 79 pivoted at 80. When the spool 73 is held to the right, as in FIG. 2, the inlet port 75 is connected to the outlet port 77. When lever 79 is permitted to move to the left, as will be hereinafter described in more detail, spring 78 moves spool 73 to the left to isolate the inlet port 75 so that high pressure air does not reach the outlet port 77. Valve 67 is mounted on a bracket 81 which is secured to a frame member 82 that forms part of the leak detector apparatus.

The leak detector apparatus comprises a cylinder 83 containing a piston 84 which drives an actuating rod 85 connected to the valve spool (not shown) in the valve housing 13. The cylinder 83 corresponds to the cylinders 60 and 160 in U.S. Pat. No. 3,385,102. Similarly, the actuating rod 85 corresponds to rods 62 and 162 in that patent, and the valve spool (not shown) corresponds to the valve spools 50 and 150 in that patent. Actuating rod 85 carries an abutment collar 86 which in its solid line position holds valve lever 79 in the closed position. It will be understood that a separate cylinder 83 together with its piston 84, actuating rod 85 and the associated valve spool is provided for each of the fixtures 1 and 2. Similarly, duplicate valves 50, 63, 67 and related connections are provided for each of the fixtures.

The piston 84 is actuated by a source of compressed air 88 through an automatic valve shown schematically at 89 of a conventional type for admitting compressed air first to the right and then to the left of piston 84 in timed sequence as explained in U.S. Pat. No. 3,385,102. The compressed air source 88 is also connected to the inlet port 75 of valve 67 through the line 76 which is connected to cylinder 83 at the right of piston 84. An operating lever 92 is shown in FIG. 1 in its off position. The lever 92 is movable to the right as shown in dotted lines to cause actuation of valve 89 for fixture 2 and to the left for actuation of the corresponding valve for fixture 1. As shown schematically in FIG. 2, the lever 92 is connected to the valve 89 through a suitable linkage 93 including a timer 94.

OPERATION

The operating procedure is to actuate the fixtures 1 and 2 in sequence as will now be described. With the handle 8 on one of the fixtures in its raised position, a test piece 10 is manually positioned by the operator on the locating disk 32 in the position shown in FIG. 2, except that at that time the locating disk will be raised slightly by springs 39. Then handle 8 is lowered to clamp the test piece 10 in place as shown in FIG. 2. When the handle 8 is lowered, it will force the valve spool 57 to the right and thereby connect the source of test gas 65 through valves 63 and 50 to the gas-receiving chamber 41 under the clamping dome 24. At the time the handle 8 is lowered, the valve 67 does not pass compressed air to its outlet 77 because valve 89 is positioned to prevent admitting compressed air to the inlet of valve 67, so that the valve ball 68 will be held by gravity and by the test gas pressure against its lower seat 70. After the handle 8 is moved to its downward position, that fixture, for example fixture 2 in the drawings, is ready for test. The test is accomplished by moving lever 92 to the right as shown dotted in FIG. 1. This causes valve 89 to admit compressed air to the right of piston 84 to initiate the testing sequences explained in detail in U.S. Pat. No. 3,385,102. The movement of lever 92 simultaneously connects the source of compressed air 88 to the inlet port 75 of valve 67 through cylinder 83 and line 76. At this instant, the valve 67 is in its open position so that compressed air is admitted through valve 67, valve 63 and valve 50 into the gas receiving chamber 41. As the compressed air moves through shuttle valve 63, it forces ball 68 against the upper seat 69, thus preventing compressed air from reaching the source of test gas 65. As the actuating rod 85 moves to the left out of cylinder 83, the abutment collar 86 will move away from the valve lever 79 toward its dotted line position. As a result, the spring 78 will move the valve spool 73 to the left to close the inlet passage 75 so that the source of compressed air 88 will be cut off, leaving just a small charge of compressed air in the gas-receiving chamber 41 and the communicating lines 55 and 62 between the chamber 41 and valve 67. Timer 94 is set so that after a test is completed valve 89 is moved to admit compressed air to the left of piston 84 to return the rod 85 to its original position, as explained in more detail in U.S. Pat. No. 3,385,102. When valve 89 is moved in this manner, the air source 88 is closed off from valve 67 so compressed air will not blast out when the operator raises handle 8 for the reloading procedure, and so that test gas can pass through the shuttle valve 63 when the operator lowers handle 8 for the next test. When valve 89 closes the source of compressed air 88 from the right of piston 84, it also vents the right side of the piston 84 to atmosphere as is customary in cylinder-piston operation.

As soon as the lever 92 has been moved to the right to start the testing sequence for fixture 2, the operator loads fixture 1 and lowers the handle 8 for that fixture. As soon as the test is completed for fixture 2 and piston 84 is returned to the right-hand position, the operator moves the lever 92 toward the now loaded fixture 1. While the test is being conducted for fixture 1, the operator unloads and reloads fixture 2; and this sequence of operation is continued throughout the test program. When the operator raises handle 8 to unload fixture 2, the handle 8 will move away from spool 57 and spring 58 will move the spool 57 to the left to isolate the inlet port 51 and conserve the test gas supply. At the same time, the gas chamber 41 will be vented to atmosphere through port 56 in order to vent the test gas away from the test area so that the test gas will not become trapped under the next test piece.

The test gas in source 65 is preferably helium and is preferably under a pressure of between one and three pounds per square inch above atmospheric pressure. The source 88 is described as a source of compressed air. Obviously other inexpensive compressed gas could be used. In any event the source of compressed gas 88 is preferably at a pressure of forty-five pounds per square inch above atmospheric pressure.

The features of this invention which I claim are as follows:

1. Leak detecting apparatus comprising means for supporting a test piece with one side thereof adapted to be exposed to a vacuum leak detector, a cover member adapted to sealingly engage the other side of said test piece to form a gas-receiving chamber between said cover member and said test piece, clamping means to force said cover member against said test piece, a test gas supply line, first valve means connected in series between said test gas supply line and said gas-receiving chamber, a gas pressure supply line, and second valve means connected in series between said gas pressure supply line and said gas-receiving chamber.

2. Leak detecting apparatus as claimed in claim 1 further comprising actuating means between said clamping means and said first valve means to cause said first valve means to open when said clamping means causes said cover member to sealingly engage the test piece.

3. Leak detecting apparatus as claimed in claim 1 further comprising a shuttle valve connected between said test gas supply line and said first and second valve means whereby, when said second valve means is open, gas from said gas pressure supply line is prevented from reaching said test gas supply line.

4. Leak detecting apparatus as claimed in claim 1 in which said leak detector comprises third valve means for connecting said one side of said test piece to the leak detector, means for moving said third valve means to connect said one side of said test piece to the leak detector, and actuating means between said moving means and said second valve means to cause said second valve means to close before said one side of said test piece is exposed to the leak detector; whereby, if said test piece ruptures, said gas pressure supply line will not be connected to said gas-receiving chamber.

5. Leak detecting apparatus as claimed in claim 1 in which said first valve means has an inlet port connected to said test gas supply line, an outlet port connected to said gas-receiving chamber, and a vent port connected to said outlet port when said outlet port is disconnected from said inlet port, said vent port being positioned away from the location of said gas-receiving chamber.

6. Leak detecting apparatus comprising a test piece supporting member for supporting a test piece with one side of the test piece adapted to be exposed to a vacuum leak detector, a cover member adapted to sealingly engage the other side of said test piece to form a gas-receiving chamber between the cover member and the test piece, means for forcing said cover member against said test piece, said supporting member being slidingly received in an adaptor member, said adaptor member having a sealing surface positioned to engage said one side of said test piece outwardly of said supporting member, and spring means urging said supporting member away from said adaptor member in the direction of said cover member.

7. Leak detecting apparatus as claimed in claim 6 in which said supporting member has an annular rim portion projecting toward said cover member, said rim portion having a hole therethrough, and said sealing surface being an annular surface surrounding said rim portion.

8. Leak detecting apparatus comprising means for supporting a test piece with one side adapted to be exposed to a vacuum leak detector and sealed from the ambient atmosphere, a cover member adapted to sealingly engage the other side of said test piece to form a gas-receiving chamber between the cover member and the test piece, a supply line for gas under pressure, a first valve connected in series between said supply line and said gas-receiving chamber, a second valve between said one side of the test piece and the leak detector, and operating means interconnecting said first and second valves for causing said first valve to be closed when said second valve is open.

9. Leak detecting apparatus comprising means for supporting a test piece with one side thereof adapted to be exposed to a vacuum leak detector, a cover member adapted to sealingly engage the other side of said test piece to form a gas-receiving chamber between said cover member and said test piece, clamping means to force said cover member against said test piece, a test gas supply line, valve means connected in series between said test gas supply line and said gas-receiving chamber, and actuating means between said clamping means and said valve means and separated from the test piece to cause said valve means to open when said clamping means causes said cover member to sealingly engage the test piece.

10. The method of testing for leaks in a test piece comprising the steps of positioning the test piece in a test apparatus so that one side of the test piece is adapted to be exposed to a leak detector, forming a gas-receiving chamber on the other side of the test piece, connecting a source of fluid under pressure to said gas-receiving chamber, and then disconnecting said fluid pressure source from said gas-receiving chamber while trapping in said chamber a charge of gas under pressure from said source, whereby the leak detector will be protected from the full supply of fluid under pressure which could otherwise pass through a hole in the test piece and reach the leak detector.

* * * * *